UNITED STATES PATENT OFFICE.

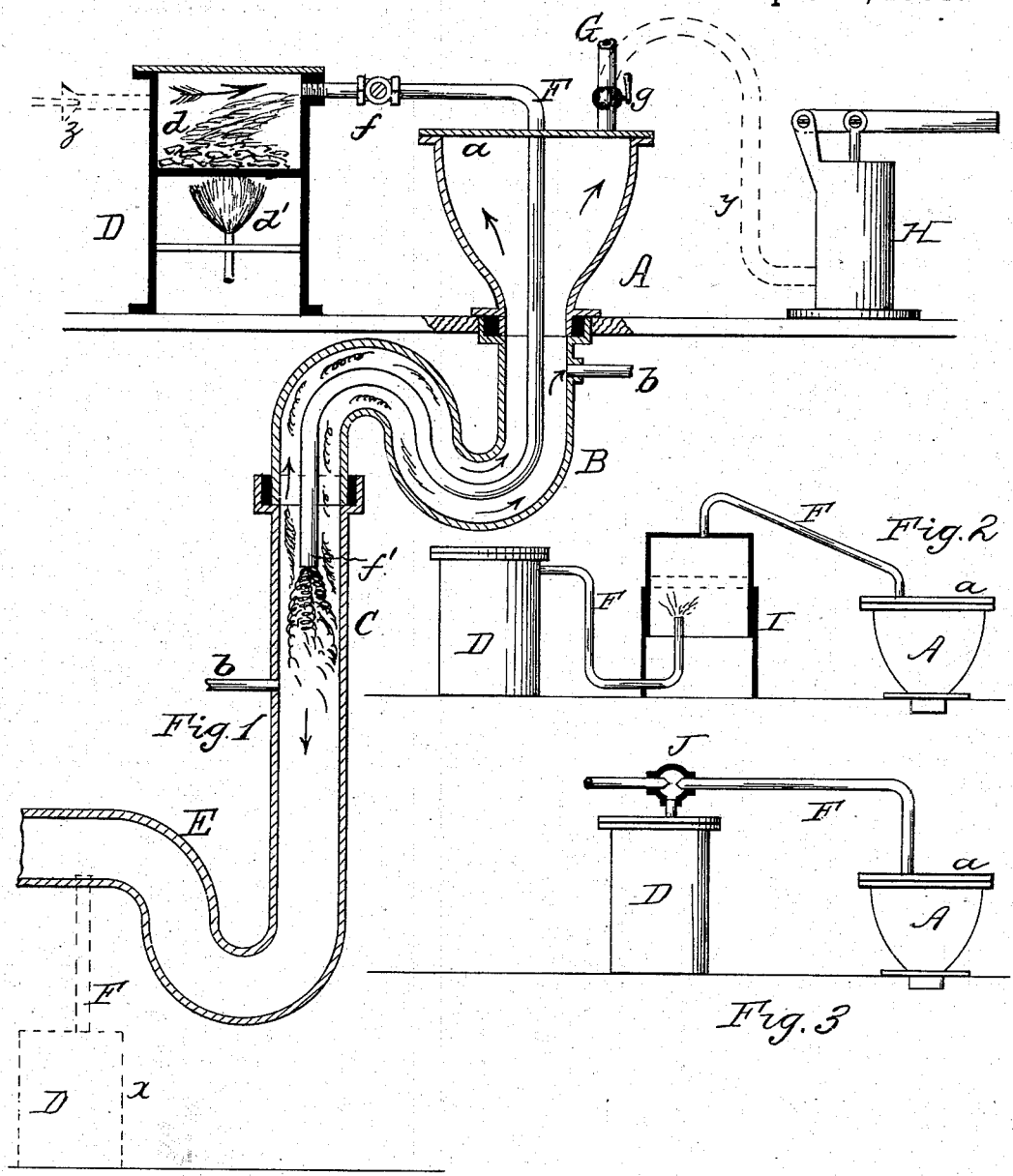

EDWARD Z. COLLINGS, OF CAMDEN, NEW JERSEY, ASSIGNOR TO THE NATIONAL ANTI-SEWER GAS COMPANY, OF SAME PLACE.

DEODORIZING AND DISINFECTING WATER-CLOSETS, &c.

SPECIFICATION forming part of Letters Patent No. 276,357, dated April 24, 1883.

Application filed January 3, 1883. (No model.)

*To all whom it may concern:*

Be it known that I, EDWARD Z. COLLINGS, a citizen of the United States, residing at Camden, in the county of Camden and State of New Jersey, have invented certain new and useful Improvements in Deodorizing and Disinfecting Water-Closets, Soil-Pipes, Sewers, &c., of which the following is a specification, reference being had therein to the accompanying drawings, wherein—

Figure 1 is a section of a water-closet, trap, and soil-pipe, illustrating the method of practicing my invention; and Figs. 2 and 3 are sectional elevations of modifications of forcing apparatus.

My invention has for its object to disinfect and deodorize water-closets, soil-pipes, sewers, and other like fixtures by introducing thereinto the fumes or gases of sulphur or other disinfectant.

My invention accordingly consists of the method of disinfecting sealed water-closets and other fixtures by fumigation, as will hereinafter be described, whereby the natural air is expelled from and the fumigating-gases are admitted to said fixtures simultaneously. The deodorizing and disinfecting material may be the fumes of sulphur, coal-tar containing carbolic acid, chlorine, or other suitable gas which will disinfect and deodorize the inner walls of the fixture and destroy all fungus growth or disease-germs adhering thereto.

My invention still further consists of the novel combination, construction, and arrangement of parts comprising an apparatus, as hereinafter more particularly described and claimed.

Referring to the accompanying drawings, A represents a water-closet; B, its trap; C, the soil-pipe; E, the trap for the latter, designed to connect with a sewer or other outlet.

D indicates a furnace, preferably portable, of any suitable or desired construction. It is represented as having a chamber, $d$, and a gas or oil flame or other source of heat, $d'$. From the chamber $d$ leads a pipe, F, passing through cap or cover $a$, which is placed upon the closet-bowl to seal or close the opening thereof. Said pipe F passes down through the trap B and enters the soil-pipe, as shown, and it is more or less flexible, so that it may accommodate itself to the outline of the fixture into which it is inserted. It is provided with a stop-cock, $f$. G represents a pipe secured to cap $a$, and, if desired, may have a cock, $g$.

The operation is as follows: The pipe F being inserted in the closet or fixture, the cap $a$ is placed in position upon the bowl to cover or seal its seat or opening, so as to prevent escape of gas therefrom. The cocks $f$ and $g$ are closed, and sulphur or other suitable ingredients are introduced into chamber $d$. Heat is then applied to the latter to cause the sulphur or other ingredients to evolve fumes or gases which accumulate in chamber $d$. The cocks $f$ and $g$ are now opened, whereupon said fumes pass through pipe F to the soil-pipe C. As they emerge from the end $f'$ of the former they ascend through the latter and the trap B and enter the closet A, causing the air therein to pass out through pipe G, and thereby facilitating the ascent of the fumes to the top of the closet-bowl. As soon as the fumes are given off by pipe G its cock $g$ is closed, whereupon the incoming fumes from pipe F gradually fill the soil-pipe C, trap E, and ramifications of pipes $b\ b$, leading to the wash-stands, bath-tubs, &c., the latter fixtures are not shown in the drawings, as their location with respect to the soil-pipe is well known. Said fixtures being thus filled with the gaseous disinfectant, their entire inner surfaces are thereby thoroughly disinfected and deodorized, and all fungus growth therein is effectually destroyed.

If desired, the pipe G may connect with an air-pump, H, as shown by dotted lines $y$, in order to more rapidly effect a withdrawal of the air in the closet and its appurtenances. So, too, if desired, an injector, $z$, Fig. 1, may be used for forcing a supply of disinfectant into chamber $d$, in addition to that evolved as above described. Again, instead of introducing the fumes into the soil-pipe as above described, they may be passed thereinto through the trap E, in which case the pipe F will connect therewith, and the furnace D be located as shown by dotted lines $x$.

If desired, a gasometer, I, may be placed between the furnace and the fixture to be disinfected, &c., as shown in Fig. 2, for obtaining the requisite pressure for the fumes; or an injector, J, as illustrated in Fig. 3, may be used for that purpose.

I have shown and described my invention as being applicable to water-closets and their fixtures; but it is evident that sewers or other conduits for conveying fecal manner or sewage may be disinfected, as above set forth; but in all cases the cap or cover a will be used to seal the inlet or inlets of the fixtures disinfected, so as to confine the fumes or gases and afford them ample opportunity to thoroughly accomplish their designed purpose.

What I claim is—

1. In disinfecting water-closets and other fixtures by fumigation, the method herein described of expelling the natural air and admitting fumigating-gases simultaneously, consisting in first sealing or closing the inlet of said fixtures, then introducing thereinto suitable fumes or gases and simultaneously withdrawing the natural air, and then closing the vent through which such air escapes, substantially as described.

2. In an apparatus for disinfecting water-closets, &c., a furnace or gas-generator, a flexible pipe or conduit, and a cap or cover provided with an outlet, substantially as shown and described.

3. In an apparatus for disinfecting water-closets, &c., the combination of a fume or gas generator, conveying pipe or conduit, sealing mechanism for closing the inlet-opening of the fixture designed to be treated, and an outlet-opening therefor provided with a cut-off, substantially as shown and described.

4. The combination of gas-generator D, flexible pipe F, having valve f, cap or cover a, and valved pipe G, as and for the purpose set forth.

In testimony whereof I affix my signature in presence of two witnesses.

EDWARD Z. COLLINGS.

Witnesses:
SAML. J. VAN STAVOREN,
CHAS. F. VAN HORN.